United States Patent
Woodworth et al.

(10) Patent No.: US 12,126,640 B2
(45) Date of Patent: Oct. 22, 2024

(54) VARIFOCAL THREAT ANALYSIS SYSTEM AND METHOD

(71) Applicant: CenturyLink Intellectual Property LLC, Broomfield, CO (US)

(72) Inventors: John R. B. Woodworth, Amissville, VA (US); Dean Ballew, Sterling, VA (US)

(73) Assignee: CenturyLink Intellectual Property LLC, Denver, CO (US)

( * ) Notice: Subject to any disclaimer, the term of this patent is extended or adjusted under 35 U.S.C. 154(b) by 296 days.

(21) Appl. No.: 17/931,655

(22) Filed: Sep. 13, 2022

(65) Prior Publication Data

US 2023/0188551 A1  Jun. 15, 2023

Related U.S. Application Data

(60) Provisional application No. 63/288,841, filed on Dec. 13, 2021.

(51) Int. Cl.
*H04L 9/40* (2022.01)

(52) U.S. Cl.
CPC ............................. *H04L 63/1425* (2013.01)

(58) Field of Classification Search
CPC ............. H04L 63/1425; H04L 63/1408; H04L 63/1416; H04L 63/1441; H04L 63/1458
See application file for complete search history.

(56) References Cited

U.S. PATENT DOCUMENTS

| | | | |
|---|---|---|---|
| 10,263,998 B1* | 4/2019 | Bhatt | H04L 63/1416 |
| 2004/0044912 A1* | 3/2004 | Connary | H04L 43/045 709/224 |
| 2011/0214187 A1* | 9/2011 | Wittenstein | H04L 61/301 726/25 |
| 2016/0072770 A1* | 3/2016 | Crane | H04L 63/1441 726/22 |
| 2016/0226905 A1* | 8/2016 | Baikalov | H04L 63/1433 |
| 2016/0232024 A1* | 8/2016 | Hamilton, II | G06F 21/53 |
| 2017/0013005 A1* | 1/2017 | Galula | H04L 63/1425 |
| 2020/0412755 A1* | 12/2020 | Jing | H04L 43/026 |
| 2021/0092129 A1* | 3/2021 | Aksela | H04L 63/0209 |
| 2021/0344690 A1* | 11/2021 | Sharifi Mehr | H04L 63/1416 |
| 2021/0344726 A1* | 11/2021 | Sharifi Mehr | H04L 63/1425 |
| 2022/0272120 A1* | 8/2022 | Li | H04L 63/0227 |
| 2023/0143232 A1* | 5/2023 | Balazs | H04L 63/1466 709/223 |
| 2023/0362191 A1* | 11/2023 | Mereddy | H04L 63/1458 |

* cited by examiner

*Primary Examiner* — Darren B Schwartz (57) ABSTRACT

Example systems and methods permit threat intelligence to be determined and used at a local, regional, and/or global level in a communications network. A threat intelligence system may collect traffic information from local computing systems and analyze it for malicious traffic. If a measure of malicious traffic in a local computing system is reached, mitigation actions may be taken in that local computing system. In addition, threat measures may be amplified in other local computing systems, other regions, or globally in the network, in order to more quickly react to a known threat as it may spread in a network.

18 Claims, 4 Drawing Sheets

VARIFOCAL THREAT ANALYSIS SYSTEM AND METHOD

CROSS-REFERENCE TO RELATED APPLICATIONS

This application claims the benefit of U.S. Provisional Application No. 63/288,841 filed Dec. 13, 2021, entitled "Varifocal Threat Analysis System and Method," which is incorporated herein by reference in its entirety.

BACKGROUND

Communications networks have increased in complexity. For example, large communication networks may process millions of queries (or more) per second. Malicious actors routinely attempt to circumvent security measures of communications networks and/or cause communications network failures. For example, distributed denial of service (DDoS) attacks have become commonplace. DDoS attacks attempt to overwhelm network components (such as domain name system (DNS) servers) by flooding the network components with bogus queries. In examples, full-scale attacks on communications networks may be preceded by pilot attacks to gauge the mitigation response of the communications networks. It is with respect to this general technical environment that examples of the present disclosure may be directed.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

In examples, the present application describes systems and methods for addressing threats in a network using varifocal analysis. For example, a method according to the present application may include defining a first region to include a first local computing system of the network and a second local computing system of the network. First local traffic information from the first local computing system may be received, and second local traffic information from the second local computing system may also be received. Based on the first local traffic information, it may be determined that a first measure of malicious traffic received in the first local computing system exceeds a local threshold. Further, based on the second local traffic information, it may be determined that a second measure of the malicious traffic received in the second local computing system does not exceed the local threshold. A first mitigation action may then be caused to be performed for the first local computing system, and the second measure of the malicious traffic in the second local computing system may be caused to be amplified. Decisions for when to amplify and mitigate may be based on information viewed at local, regional, and/or global network level(s).

In another example, a system is provided comprising at least one processor and memory, operatively connected to the at least one processor and storing instructions that, when executed by the at least one processor, cause the system to perform a method. For example, the method may include defining a first region to include a first local computing system of the network and a second local computing system of the network. First local traffic information from the first local computing system may be received, and second local traffic information from the second local computing system may also be received. Based on the first local traffic information, it may be determined that a first measure of malicious traffic received in the first local computing system exceeds a local threshold. Further, based on the second local traffic information, it may be determined that a second measure of the malicious traffic received in the second local computing system does not exceed the local threshold. A first mitigation action may then be caused to be performed for the first local computing system, and the second measure of the malicious traffic in the second local computing system may be caused to be amplified. Decisions for when to amplify and mitigate may be based on information viewed at local, regional, and/or global network level(s).

In another example, a method according to the present application may include defining a first region to include a first local computing system of the network and a second local computing system of the network. First local traffic information from the first local computing system may be received, and second local traffic information from the second local computing system may also be received. Based on the first local traffic information, it may be determined that a first measure of malicious traffic received in the first local computing system exceeds a local threshold. Further, based on the second local traffic information, it may be determined that a second measure of the malicious traffic received in the second local computing system does not exceed the local threshold. A first mitigation action may then be caused to be performed for the first local computing system, and the second measure of the malicious traffic in the second local computing system may be caused to be amplified by an amplification factor, wherein the amplification factor is determined based on the threat type. Decisions for when to amplify and mitigate may be based on information viewed at local, regional, and/or global network level(s). For example, the method may further include causing a second mitigation action to be performed for the second local computing system upon detection of any of the following events: the amplified second measure exceeds the local threshold; a first regional measure of the malicious traffic in the first region exceeds a first regional threshold; or a global regional measure of the malicious traffic in the network exceeds a global threshold.

BRIEF DESCRIPTION OF THE DRAWINGS

Non-limiting and non-exhaustive examples are described with reference to the following Figures.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. In addition, all systems described with respect to the Figures can comprise one or more machines or devices that are operatively connected to cooperate in order to provide the described system functionality. The following detailed description is therefore not to be taken in a limiting sense, and the scope of the present disclosure is defined by the appended claims and their equivalents.

Threat intelligence systems that view network data from only a single perspective are limited. For example, a threat intelligence system may set a threshold for a network as a whole that if the traffic on the network goes up by a certain percentage, then mitigation actions will be instituted. However, if there is an attack (e.g., a DDoS attack) on just one or two of a large number of, e.g., DNS servers, then the volume of traffic on the network as a whole may not rise enough on a percentage basis to cause mitigation actions to be taken. This prevents the system from recognizing what might be a "pilot" attack as a precursor to an attack of the network as a whole. Further, if the threat intelligence system works only on a local level, then each local computing system will react only when its own threshold is reached, and local computing systems do not benefit from threat information collected by other local computing systems.

Example systems and methods of the present application permit threat intelligence to be determined and used at a local, regional, and/or global level in a communications network. In examples, network traffic is monitored at a variety of local computing systems in the network. For example, a collector may be instantiated at each local computing system in the network to collect traffic information that is being received by that local computing system. The collector may, in examples, sample messages received by each local computing system and provide those messages (or information about those messages) to a threat intelligence system. The threat intelligence system may collect the traffic information from each of the local computing systems and analyze it for malicious traffic. The traffic information may include both information about the traffic and an identification of the particular local computing system at which the traffic was received.

In examples, the threat intelligence system may analyze the traffic information and identify threats. In examples, when message meeting a particular threat profile is identified from the traffic information, a threat measure may be increased (e.g., incremented). In examples, the threat measure may be specific both to a particular threat profile and a particular local computing system on which the threat was observed. Threat measures can then be used to cause mitigation actions to be taken. For example, if a threat measure at a local computing system exceeds a local threshold, the local computing system may be directed to institute mitigation actions. Mitigation actions may comprise instituting filters, on-demand scrubbers, or other rules or components to mitigate effects of the identified threat(s).

In addition, the threat measure from one local computing system may be used to (a) cause mitigation action(s) to be taken elsewhere in the network; or (b) to amplify a measure of the same threat that may be detected elsewhere in the network. In examples, amplifying the threat measure in other areas of the network may comprise applying an amplification factor to a threat measure for messages having the same threat profile. For example, if a first threat measure for a particular threat in a first local computing system exceeds a local threshold, mitigation actions may be instituted in the first local computing system. If a second threat measure for that same threat in a second local computing system does not exceed the local threshold, mitigation measures in the second local computing system may not be implemented, but an amplification factor may be applied to the second threat measure. For example, each time the particular threat is then detected in the second local computing system, it may be counted 5× towards determining whether the second threat measure exceeds the local threshold. In this manner, the system may cause mitigation actions to be implemented more quickly in the second local computing system as the threat may spread.

In addition, amplification and mitigation may be implemented on a regional basis. For example, a first region may be defined to include first and second local computing systems in the network, while a second region may be defined to include third and fourth local computing systems in the network. In examples, when the first threat measure in the first local computing system exceeds a local threshold, it may cause amplification at the second local computing system (in the same region), but nothing in the third and fourth local computing systems (in a different region). When the combined threat measure in the first region exceeds a regional threshold, however, mitigation actions may be taken in both the first and second local computing systems, and amplification for that same threat may be instituted in the second region (third and fourth local computing systems). In examples, mitigation actions may not be implemented in the second region until the local threshold (for individual third and fourth local computing systems) or a regional threshold (for the second region) are reached. In other examples, global amplification and/or mitigation may be implemented when a certain number of local and/or regional thresholds are reached. In examples, more than three levels (local, regional, global) may be defined in the network. For example, multiple sub-regional or super-regional levels may also be defined and tracked for the purposes of implementing mitigation and/or amplification actions.

Amplification and mitigation may also be ceased based on a local, regional, or global basis based on individual or aggregate threat measures over time. In this manner, examples of the present systems and methods may be able to (a) more quickly react to threats spreading through the network; (b) appropriately scope mitigation actions to not unduly burden network components; and (c) dynamically deescalate threat mitigation on a local, regional, and global basis.

Figure 1:
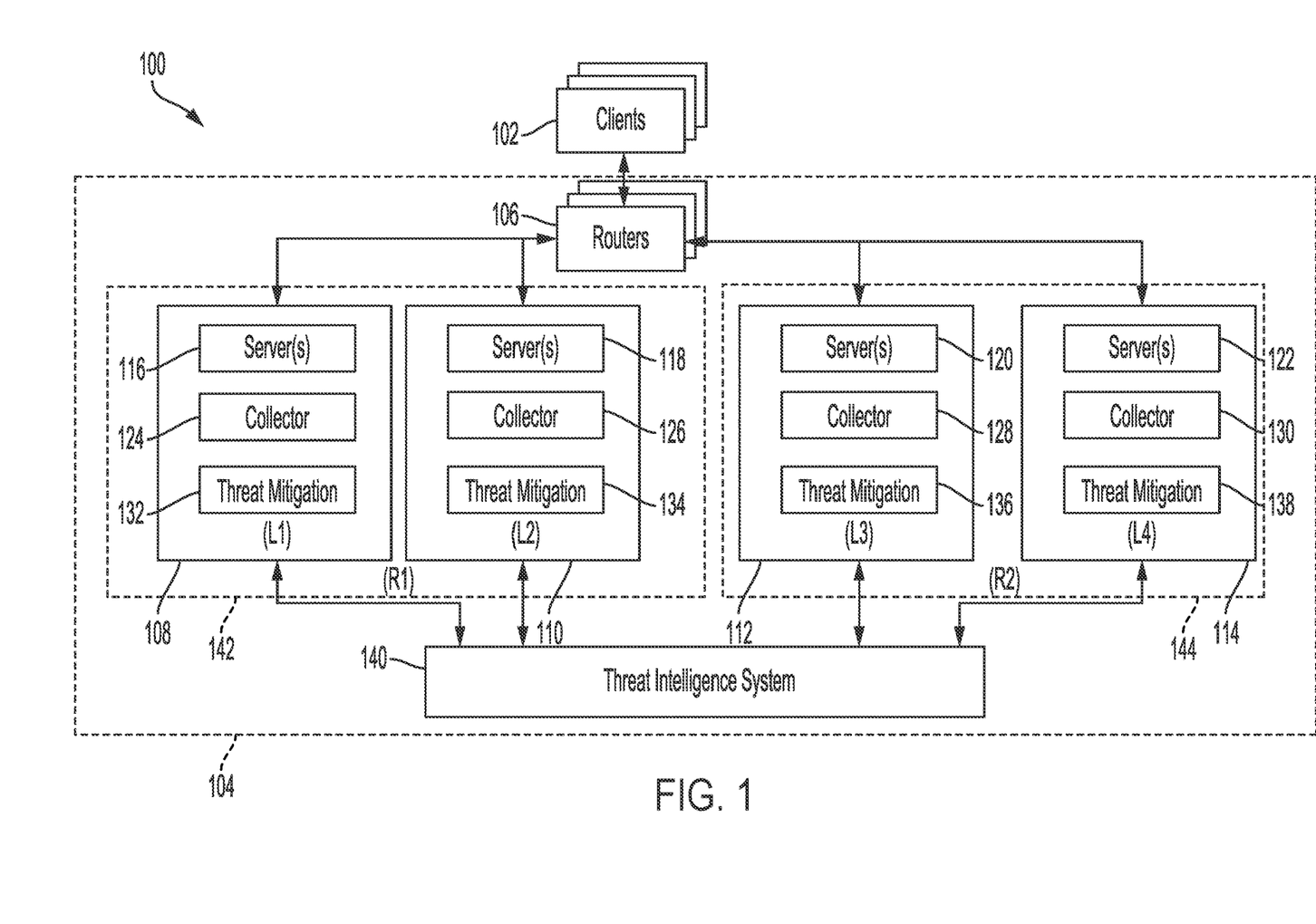
FIG. 1 depicts an example system for processing threat intelligence in a communications network.

FIG. 1 depicts an example system 100. Client devices 102 may connect to a communications network 104 by sending requests through routers 106. Routers 106 may route requests from client devices to one or more local computing systems 108, 110, 112, and 114. In examples, local computing system 108 may be referred to herein as local computing system L1, local computing system 110 may be referred to as local computing system L2, local computing system 112 may be referred to as local computing system L3, and local computing system 114 may be referred to as local computing system L4.

In examples, each of the local computing systems L1-L4 may comprise one or more server computing devices, 116, 118, 120, and 122, respectively. Each of the local computing systems L1-L4 may also comprise a collector, 124, 126, 128, and 130, respectively, and a threat mitigation system, 132, 134, 136, and 138, respectively. In addition, each of the local computing systems L1-L4 may communicate with a threat intelligence system 140. In addition, local computing systems L1 and L2 may be grouped into a first region 142 (also referred to herein as R1), and local computing systems L3 and L4 may be grouped into a second region 144 (also referred to herein as R2). Operation of the system 100 is discussed below.

For example, a client device 106 may be operatively connected to a router 106 that is logically or geographically closest to the client device 102 or through other load balancing or routing mechanisms. The client may send a request (e.g., a query) that includes a destination internet protocol (IP) address. One or more routers may then route the client request to one of the local computing systems, such as local computing system L1. For example, the client device 102 may send a request to an Anycast address, and the router(s) 106 may determine that local computing system L1 is the logically closest (or least-cost) system that is advertising that Anycast address. As such, the router(s) 106 may route the request to a Unicast address for server(s) 116 within local computing system L1. Messages from clients 102 to other local computing systems L2-L4 may be similarly routed by routers 106. In examples, server(s) 116, 118, 120 may comprise one or more physical servers, virtualized server(s) managed by a hypervisor running on one or more physical server(s), or any combination thereof.

Local computing systems L1-L4 may also include a collector, such as collectors 124, 126, 128, 130. As an illustrative example, collector 124 may comprise a system to inspect, log, and/or sample any messages received by computing system L1, including server(s) 116. In examples, the collector 124 may sample and log some or all of the messages received by server(s) 116. For example, depending on the volume of traffic, the collector 124 may sample at a sampling rate of every $10^{th}$, $100^{th}$, $1,000^{th}$ message received, or any other sampling rate. In examples, collector 124 sends local traffic information to threat intelligence system 140. The local traffic information may include full packets sampled from the messages received and sampled at server(s) 116. In other examples, the local traffic information may include only certain information tuples, such as source IP address and destination IP address for sampled packets. In other examples, the local traffic information may include portions of the packets (e.g., certain headers) and/or information that has been derived from the sampled packets. Depending on the particular type of threat intelligence system 140 being utilized, the local traffic information collected and sent by collector 124 may be tailored to the particular needs of the threat intelligence system 140.

In examples, the other collectors 126, 128, 130 may operate similarly to collector 124. In some examples, the threat intelligence system may be partially distributed among the local computing systems L1-L4, such that one or more elements of local computing systems L1-L4 perform some level of threat detection. For example, servers 116-122 and/or collectors 124-130 may comprise or be operatively connected to elements, such as smart network interface cards (NICs), that can analyze traffic being received at servers 116-122 and determine that some portion of the traffic may comprise a threat. In other examples, the servers 116-122 and/or collectors 124-130 may not detect a threat, per se, but may extract, normalize, or otherwise process packets to allow for threat intelligence system 140 to more easily identify threats in the traffic being routed to local computing systems L1-L4.

In examples, the threat intelligence system 140 may comprise a separate, central computing system operatively connected to local computing systems L1-L4. In other examples, some or all of the threat intelligence system may be distributed. For example, portions of threat intelligence system 140 may be instantiated within local computing systems L1-L4, such as in a smart NIC or otherwise. In examples, however, the threat intelligence system 140 obtains local traffic information from the local computing systems L1-L4 that permits the threat intelligence system 140 to view traffic information, and cause threat amplification/mitigation actions to be taken, on a local, regional, and/or global level.

For example, the threat intelligence system 140 may collect the local traffic information from each of the local computing systems L1-L4 and analyze it for malicious traffic. The traffic information may include both information about the traffic and an identification of the particular local computing system at which the traffic was received. In examples, the threat intelligence system 140 may analyze the traffic information and identify threats. In examples, when a threat is identified from the local traffic information, a threat measure may be increased. In examples, the threat measure may be specific both to a particular threat profile and a particular local computing system on which the threat was observed. For example, the local traffic information from local computing system L1 may indicate a sudden increase in queries received from a particular source (e.g., client) IP address to a particular destination IP address that is served by server(s) 116. The threat intelligence system may identify this as a threat having a threat profile comprising messages with that source IP address and destination IP address. In other examples, the threat profile may comprise information about the port from which messages are sent or on which messages are received. In other examples, the threat profile may comprise information about a particular destination domain in combination with some other aspect of the query. In examples, the threat measure may comprise a count of queries or messages meeting that threat profile that are received by a particular local computing system (L1-L4) or region (R1-R2). Other examples of threat measures are possible. For example, a threat measure may comprise a percentage of a certain type of traffic meeting a threat profile.

Threat measures can be compared to one or more thresholds to determine certain actions to be taken. Thresholds may be time-based. For example, a threshold may comprise a certain number of messages meeting a threshold within a preset window of time (e.g., the past X minutes). If a threat measure exceeds an applicable threshold, the threat measure can be used to cause one or more mitigation actions to be taken, e.g., by one or more threat mitigation system 132, 134, 136, 138. For example, if a threat measure at a local computing system L1 exceeds a local threshold for L1, the local computing system L1 (including threat mitigation system 136) may be directed by threat intelligence system 140 to institute mitigation actions. Mitigation actions may comprise instituting filters, on-demand scrubbers, or other rules or components to mitigate effects of the identified threat(s). For example, threat mitigation system 136 may comprise an on-demand scrubber or a filtering system that can apply one or more mitigation rules provided by threat intelligence system 140. One example of a mitigation rule may be to drop or ignore any messages that fit criteria defined by the mitigation rule—e.g., any messages that have a particular source IP address and/or destination IP address. In other examples, mitigation rules may cause delayed responses to client queries (without dropping the messages entirely). Mitigation actions can be implemented for a preset period of time, until the condition causing the mitigation action to be taken has been remedied, or until an administrator of threat intelligence system 140 determines the threat mitigation action is no longer necessary, among other options.

In addition to causing threat mitigation actions to be taken in the local computing system (e.g., L1) where the threat measure exceeded a local threshold, the threat measure from one local computing system L1-L4 may be used to (a) cause mitigation action(s) to be taken elsewhere in the network 104; or (b) to amplify a measure of the same threat that may be detected elsewhere in the network 104. In examples, amplifying the threat measure in other areas of the network may comprise applying an amplification factor to a threat measure for a threat having the same threat profile. For example, if a first threat measure for a particular threat in the first local computing system L1 exceeds a local threshold, mitigation actions may be instituted in the first local computing system. If a second threat measure for that same threat profile in the second local computing system L2 does not exceed the local threshold, mitigation measures in the second local computing system may not be implemented; however, an amplification factor may be applied to the second threat measure. For example, each time the particular threat (e.g., a message received at L2 having the identified source IP address and/or destination IP address) is then detected in the second local computing system L2, it may be counted 5× towards determining whether the second threat measure exceeds the local threshold. In this manner, the threat intelligence system 140 may cause mitigation actions to be implemented more quickly in the second local computing system L2 as the threat may spread.

In addition, amplification and mitigation may be implemented on a regional basis. For example, as shown in FIG. 1, a first region 142 (R1) may be defined to include first and second local computing systems L1 and L2 in the network 104, while a second region 144 (R2) may be defined to include third and fourth local computing systems L1 and L4 in the network 104. In examples, the regions may be defined by an administrator of the network 104, and definitions of the regions may be stored in threat intelligence system 140. Regions can be based on security boundaries, geographic location, logical proximity, or otherwise. In addition, threat intelligence system 140 may include a user interface to set or adjust regions based on changing topography of network 104.

Threat intelligence system 140 may also allow (e.g., through a user interface) for thresholds of threat measures to be set on a local, regional, and global level. For example, as discussed, a local threshold may be set so that if a threat measure in any local computing system L1-L4 exceeds that threshold, then threat intelligence system causes mitigation action(s) to be taken in that local computing system. A separate regional threshold can be set for the regions (e.g., R1, R2) so that if a total threat measure for the region exceeds a threshold, mitigation actions are caused to be taken in all local computing systems that are defined within that region. Similarly, a global threshold may be set (e.g., through a user interface for threat intelligence system 140) so that if a cumulative threat measure for all local computing systems (e.g., L1, L2, L3, and L4) exceeds the global threshold, then threat mitigation actions are caused to be taken in all local computing systems in the network 104.

In examples, the thresholds may also be automatically set and/or changed based on machine learning and/or artificial intelligence (ML/AI) operating as part of or in concert with threat intelligence system 140. ML/AI systems may also be used to identify malicious traffic and threat profiles for particular threat types. For example, the ML/AI system comprising part of threat intelligence system 140 may be trained on earlier labeled data sets of local traffic information in network 104. In examples, the earlier data sets may include known, labeled examples of malicious traffic, and thresholds automatically set by the ML/AI system during training may be verified/tuned based on the training sets. In other examples, the ML/AI system may be unsupervised. In either event, over time, the ML/AI of threat intelligence system 140 may determine and/or adjust the thresholds to optimize the stability of the network 104 and the efficiency of threat mitigation. For example, the threat intelligence system 140 (e.g., using ML/AI) may seek to balance the CPU usage of local computing systems L1-L4 spent performing mitigation actions versus responding to client queries. In examples, local thresholds may be the same for all local computing systems, regional thresholds may be the same for all regions, etc. In other examples, individual local thresholds or regional thresholds may be set.

Threat amplification may also be implemented using regional groupings of local computing systems. As discussed, when the first threat measure in the first local computing system L1 exceeds a local threshold, it may cause amplification at the second local computing system L2 (in the same region R1), but nothing in the third and fourth local computing systems L3 and L4 (in a different region R2). When the combined threat measure in the first region (e.g., R1, comprising L1 and L2) exceeds a regional threshold, however, mitigation actions may be taken in both L1 and L2 of R1, and amplification for that same threat may be instituted in the second region R2 (L3 and L4). In examples, mitigation actions may not be implemented in the second region R2 until the local threshold (for individual third and fourth local computing systems L3 and L4) or a regional threshold (for R1) is reached. In other examples, global amplification and/or mitigation may be implemented when a certain number of local and/or regional thresholds are reached. In some examples, amplification may not be instituted in a particular local computing system or region unless and until at least some messages meeting the identified threat profile are actually seen in that local computing system or region.

In examples, threat amplification may be time-based. For example, threat amplification may be configured to occur for a preset period of time after a threat of a particular profile is first recognized anywhere in the network 104. In other examples, the threat amplification may be configured to occur for a preset period of time after a threat of a particular profile was last recognized anywhere in the network 104 (e.g., based on a last-seen timestamp). In other examples, threat amplification may be configured to cease upon determination by threat intelligence system 140 no threat measure of that threat profile from any local computing system L1-L4 is exceeding a local threshold (or some preset period of time thereafter). Other termination schemes for threat amplification are also possible.

Table 1 describes one example of a threat mitigation and amplification schema according to the present disclosure. In examples, the schema of Table 1 could be implemented by instructions issued to local computing systems L1-L4 by threat intelligence system 140 and/or by actions of threat intelligence system 140, or by other elements of network 104, or combinations thereof. Table 1 represents only one potential threat mitigation and amplification schema, and other variations are possible and within the scope of the present application. In Table 1, entries in the left column represent the local computing system (L1, L2, L3, or L4)

that would be affected by the amplification or mitigation. The second column lists, for each local computing system in the left column, the events that would cause amplification of a threat measure for that local computing system. The right column lists, for each local computing system in the left column, the events that would cause mitigation actions to be instituted for that local computing system.

TABLE 1

|  | Amplify | Mitigate |
|---|---|---|
| Local Computing System 1 (R1) | L2 Threshold Exceeded<br>R2 Threshold Exceeded | L1 Threshold Exceeded<br>R1 Threshold Exceeded<br>G Threshold Exceeded |
| Local Computing System 2 (R1) | L1 Threshold Exceeded<br>R2 Threshold Exceeded | L2 Threshold Exceeded<br>R1 Threshold Exceeded<br>G Threshold Exceeded |
| Local Computing System 3 (R2) | L4 Threshold Exceeded<br>R1 Threshold Exceeded | L3 Threshold Exceeded<br>R2 Threshold Exceeded<br>G Threshold Exceeded |
| Local Computing System 4 (R2) | L3 Threshold Exceeded<br>R1 Threshold Exceeded | L4 Threshold Exceeded<br>R2 Threshold Exceeded<br>G Threshold Exceeded |

For example, and referring to Table 1, an amplification of the threat measure for a particular threat profile would be instituted for local computing system L1 if either (a) the threat measure of that threat profile for local computing system L2 exceeds the local threshold; or (b) the threat measure of that threat profile for region R2 exceeds the regional threshold. Further, mitigation actions would be caused to be taken in local computing system L1 if any of the following occurred: (a) the threat measure of a threat profile for local computing system L1 exceeds the local threshold; (b) the threat measure of that threat profile for region R1 exceeds the regional threshold; or (c) the threat measure of that threat profile for the network 104 exceeds the global threshold.

By contrast, and referring further to the example schema of Table 1, an amplification of the threat measure for a particular threat profile would be instituted for local computing system L2 if either (a) the threat measure of that threat profile for local computing system L1 exceeds the local threshold; or (b) the threat measure of that threat profile for region R2 exceeds the regional threshold. Further, mitigation actions would be caused to be taken in local computing system L2 if any of the following occurred: (a) the threat measure of a threat profile for local computing system L2 exceeds the local threshold; (b) the threat measure of that threat profile for region R1 exceeds the regional threshold; or (c) the threat measure of that threat profile for the network 104 exceeds the global threshold.

In addition, and referring further to the example schema of Table 1, an amplification of the threat measure for a particular threat profile would be instituted for local computing system L3 if either (a) the threat measure of that threat profile for local computing system L4 exceeds the local threshold; or (b) the threat measure of that threat profile for region R1 exceeds the regional threshold. Further, mitigation actions would be caused to be taken in local computing system L3 if any of the following occurred: (a) the threat measure of a threat profile for local computing system L3 exceeds the local threshold; (b) the threat measure of that threat profile for region R2 exceeds the regional threshold; or (c) the threat measure of that threat profile for the network 104 exceeds the global threshold.

Finally, and referring further to the example schema of Table 1, an amplification of the threat measure for a particular threat profile would be instituted for local computing system L4 if either (a) the threat measure of that threat profile for local computing system L3 exceeds the local threshold; or (b) the threat measure of that threat profile for region R1 exceeds the regional threshold. Further, mitigation actions would be caused to be taken in local computing system L4 if any of the following occurred: (a) the threat measure of a threat profile for local computing system L4 exceeds the local threshold; (b) the threat measure of that threat profile for region R2 exceeds the regional threshold; or (c) the threat measure of that threat profile for the network 104 exceeds the global threshold.

Figure 2:
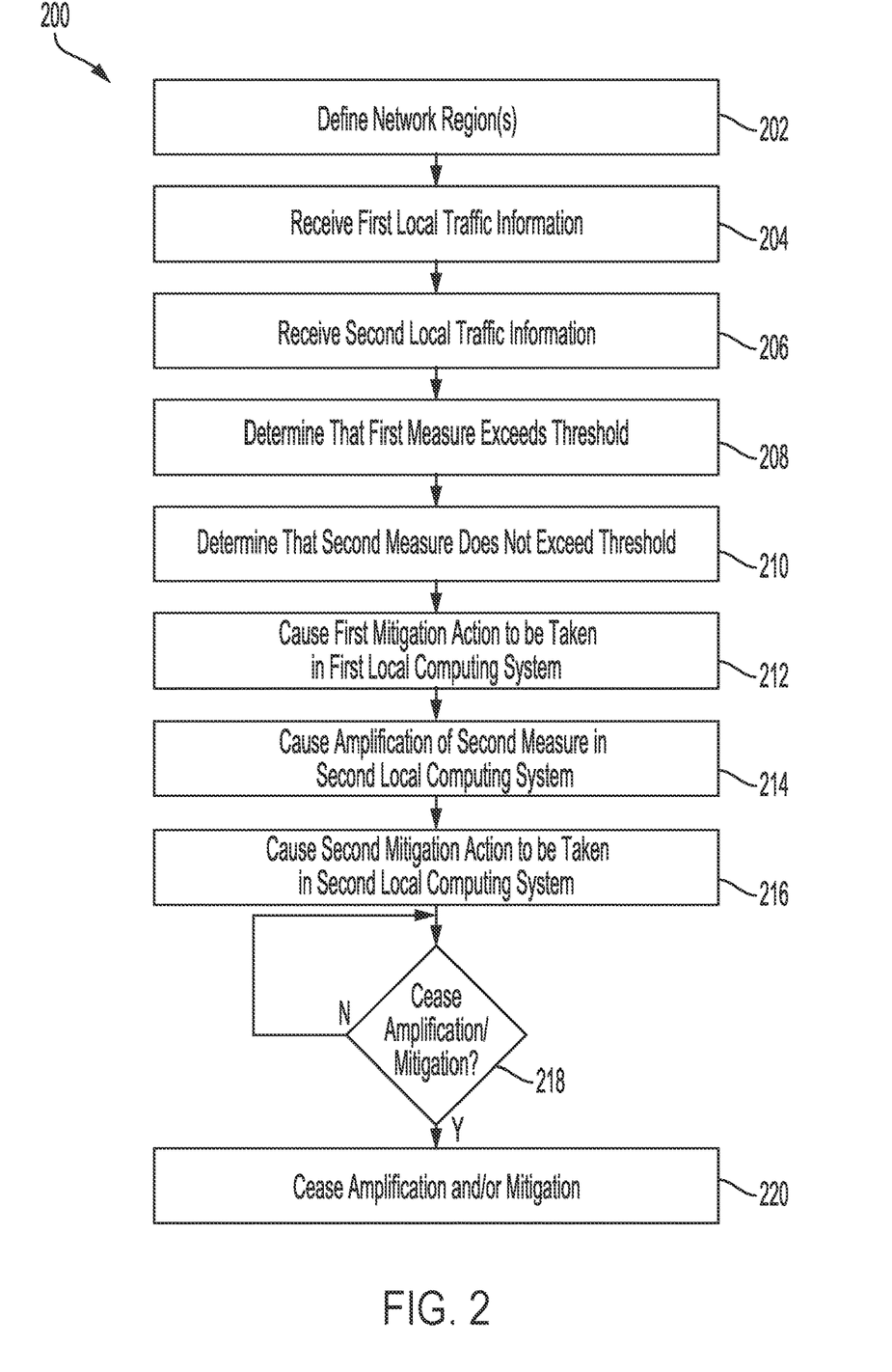
FIG. 2 depicts an example method for processing threat intelligence in a communications network.

FIG. 2 depicts a method 200 for implementing examples of the present application. In examples, operations of the method 200 may be performed by the threat intelligence system 140, although the method 200 is not limited to operations performed only by the threat intelligence system 140. Method 200 begins at operation 202, where a first region is defined to include a first local computing system of the network and a second local computing system of the network. In examples, operation 202 may include also defining other regions, such as a second region to include a third local computing system and a fourth local computing system. For example, threat intelligence system may define and maintain regions within network 104. In the example of FIG. 1, the first region (R1) is defined to include local computing systems L1 and L2, and the second region (R2) is defined to include local computing systems L3 and L4. More or fewer local computing systems may be included in a region. Regions may be defined based on security boundaries, geographic location, logical proximity, or otherwise. In addition, threat intelligence system 140 may include a user interface to set or adjust regions based on changing topography of network 104.

Flow proceeds to operation 204, where first local traffic information is received from the first local computing system. In examples, the threat intelligence system 140 receives first local traffic information from local computing system L1. The local traffic information may include full packets sampled from messages received and sampled at server(s) 116 of local computing system L1. In other examples, the local traffic information may include only certain information tuples, such as source IP address and destination IP address for sampled packets. In other examples, the local traffic information may include portions of the packets (e.g., certain headers) and/or information that has been derived from the sampled patents. Depending on the particular type of threat intelligence system 140 being utilized, the local traffic information may be tailored to the particular needs of the threat intelligence system 140.

Flow proceeds to operation 206, where second local traffic information from the second local computing system is received. In examples, the threat intelligence system 140 receives second local traffic information from local computing system L2. The second local traffic information may be of similar character to the first local traffic information.

Flow proceeds to operation 208, where, based on the first local traffic information, it is determined that a first measure of malicious traffic received in the first local computing system exceeds a local threshold. For example, the threat intelligence system 140 may identify a particular threat profile in the first local traffic information. In other examples, the threat intelligence system 140 may observe a significant percentage increase in overall traffic of the first local computing system L1, which may trigger the threat intelligence system 140 to identify a profile of potentially malicious traffic causing the increase in traffic. One type of threat might be a DDoS attack, and a threat profile for that type of threat might be messages having particular source IP address(es) and/or destination IP address(es) in combination with other factor(s) (e.g., server port). In some examples, the threat intelligence system 140 may, after identifying a particular threat profile in the traffic of the first local computing system L1, begin to monitor a threat measure for that threat profile. For example, the threat intelligence system 140 may institute a counter of messages fitting that profile received at first local computing system L1 in a set period of time (e.g., the previous hour). In other examples, the first local computing system L1, itself, may be instructed by threat intelligence system 140 to perform a particular threat measure, and the threat measure may be included in, or comprise, the first local traffic information.

Further, as discussed, a local threshold may be established by threat intelligence system 140 in a variety of manners. For example, threat intelligence system 140 may include a user interface to allow an administrator to set manual thresholds for particular types of threats. In other examples, thresholds may be automatically set and/or continually adjusted via ML/AI systems, or otherwise. In examples, a local threshold for a particular threat type and/or threat profile may be the same for all local computing systems L1-L4.

Flow proceeds to operation 210, where, based on the second local traffic information, it is determined that a second measure of the malicious traffic received in the second local computing system does not exceed the local threshold. For example, the threat intelligence system 140 may determine that traffic in the second local computing system L2 with the particular threat profile identified in the first local traffic information does not meet the local threshold. In examples, the threat may be localized at least temporarily within first local computing system L1 and has not yet spread to local computing system L2 to the extent necessary for the second measure to reach the local threshold. This could be the result, in examples, of a pilot attack that is at least initially observed only in local computing system L1.

Flow proceeds to operation 212, where a first mitigation action is caused to be performed for the first local computing system. As discussed, in examples, this may comprise threat intelligence system 140 instructing a threat mitigation system 132 on local computing system L1 to perform one or more mitigation actions. Mitigation actions may comprise instituting filters, on-demand scrubbers, or other rules or components to mitigate effects of the identified threat(s). For example, threat mitigation system 136 may comprise an on-demand scrubber or a filtering system that can apply one or more mitigation rules provided by threat intelligence system 140. One example of a mitigation rule may be to drop or ignore any messages that fit criteria defined by the mitigation rule—e.g., any messages that have a particular source IP address and/or destination IP address. In other examples, mitigation rules may cause delayed responses to client queries (without dropping the messages entirely). Mitigation actions can be implemented for a preset period of time, until the condition causing the mitigation action to be taken has been remedied, or until an administrator of threat intelligence system 140 determines the threat mitigation action is no longer necessary, among other options.

Flow proceeds to operation 214, where the second measure of the malicious traffic in the second local computing system is caused to be amplified. As discussed, different schemas for instituting amplification are possible, in one example, operation 214 may be triggered when at least one of the following is true: (a) the first measure for local computing system L1 exceeds the local threshold; or (b) a second regional measure of the malicious traffic in a second region (R2) exceeds a second regional threshold.

In examples, amplifying the second threat measure may comprise applying an amplification factor to the second threat measure. For example, each time a message received in the second local computing system L2 meets the threat profile identified in L1 (such as having the identified source IP address and/or destination IP address), it may be counted 5× towards determining whether the second threat measure exceeds the local threshold. In this manner, the threat intelligence system 140 may cause mitigation actions to be implemented more quickly in the second local computing system L2 as the threat may spread. In examples, the amplification factor may be different for different types of threats. For example, the amplification factor may be greater for threats known to spread quickly or threats of greater significance. In examples, the ML/AI system within threat intelligence system 140 may recognize a threat type (e.g., a DDoS attack) and scale the amplification factor accordingly in order to most efficiently and effectively address the threat.

Further, threat amplification may be time-based. For example, threat amplification may be configured to occur for a preset period of time after a threat of a particular profile is first recognized anywhere in the network 104. In other examples, the threat amplification may be configured to occur for a preset period of time after a threat of a particular profile was last recognized anywhere in the network 104 (e.g., based on a last-seen timestamp). In other examples, threat amplification may be configured to cease upon determination by threat intelligence system 140 no threat measure of that threat profile from any local computing system L1-L4 is exceeding a local threshold (or some preset period of time thereafter). Other termination schemes for threat amplification are also possible, as discussed below.

Flow proceeds to operation 216, where threat mitigation at the second local computing system is implemented. As discussed, different schemas for instituting mitigation are possible. In one example, operation 216 may be triggered when at least one of the following is true: (a) the amplified second measure for local computing system L2 exceeds the local threshold; (b) a first regional measure of the malicious traffic in the first region (R1) exceeds a first regional threshold; or (c) a global regional measure of the malicious traffic in the network 104 exceeds a global threshold. In some examples, the first regional measure of the malicious traffic in the first region comprises the first measure and the amplified second measure. In examples where threat mitigation for the second local computing system is implemented, mitigation actions are caused to be taken at the second local computing system. For example, this may comprise threat intelligence system 140 instructing a threat mitigation system 134 on local computing system L2 to perform one or more mitigation actions.

Flow proceeds to operation 218, where it is determined whether to cease amplification and/or mitigation. As discussed, the determination at operation 218 could be based on multiple factors. For example, threat amplification and/or mitigation at individual local computing system L1-L4 or regions R1-R2 may be time-based. For example, threat amplification and/or mitigation may be configured to occur for a preset period of time after a threat of a particular profile is first recognized anywhere in the network 104, within a particular region R1-R2, or within a particular local computing system L1-L4. In other examples, the threat amplification and/or mitigation may be configured to occur for a preset period of time after a threat of a particular profile was last recognized anywhere in the network 104 (e.g., based on a last-seen timestamp), within a particular region R1-R2, or within a particular local computing system L1-L4. In other examples, threat amplification and/or mitigation may be configured to cease upon determination by threat intelligence system 140 no threat measure of that threat profile from any local computing system L1-L4 is exceeding a local threshold (or some preset period of time thereafter). In other examples, ceasing of threat mitigation or threat amplification (globally, for a particular region, or locally) may be tied to the condition that caused the threat mitigation or threat amplification to be instituted. Other termination schemes for threat amplification are also possible. In addition, threat intelligence system can make individual decisions to cease or scale back mitigation or amplification at the local, regional, and/or global level. For example, the threat intelligence system may send instructions causing a local computing system L1 to cease mitigation actions but maintain amplification, while also instructing local computing system L2 to maintain both mitigation and amplification.

If it is determined at operation 218 that some portion of amplification and/or mitigation should be ceased, then flow proceeds to operation 220, where that portion of the amplification/mitigation currently being applied is ceased. For example, threat intelligence system 140 may stop amplifying threat measures received from, or derived for, local computing systems L1-L4, as needed. Further, threat intelligence system may provide instructions to threat mitigation system(s) 132, 134, 136, 138 to stop applying previously required mitigation actions (e.g., on-demand scrubbers may be de-allocated, filters that were being applied may be removed, etc.). Again, the instructions from threat intelligence system 140 to cease or de-escalate mitigation and amplification conditions may be global, regional, or local in nature.

If it is determined at operation 218 that at least some portion of amplification and/or mitigation is not to be ceased, then the method 200 loops back periodically (or upon detection of an event/change affecting termination of amplification/mitigation) to again determine at operation 218 whether to cease the remaining amplification or mitigation, until all amplification/mitigation for that threat has been ceased at operation 220.

Figure 3:
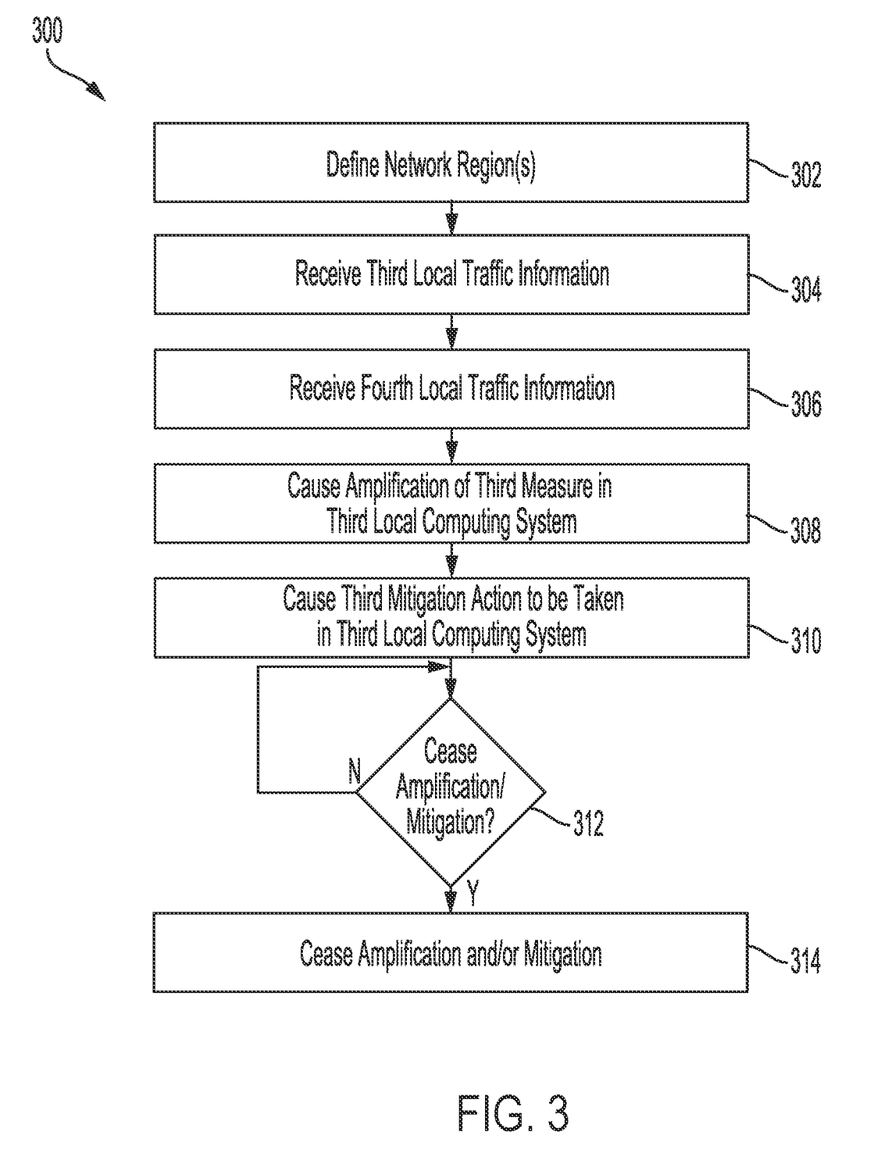
FIG. 3 depicts an additional example method for processing threat intelligence in a communications network.

FIG. 3 depicts a method 300 for implementing examples of the present application. In examples, method 300 may be performed in concurrently and in concert with one or more operations of method 200. In examples, operations of the method 300 may be performed by the threat intelligence system 140, although the method 300 is not limited to operations performed only by the threat intelligence system 140. Method 300 begins at operation 302, where a second region is defined to include a third local computing system of the network and a fourth local computing system of the network. For example, as discussed, threat intelligence system 140 may define and maintain regions within network 104. In the example of FIG. 1, the first region (R1) is defined to include local computing systems L1 and L2, and the second region (R2) is defined to include local computing systems L3 and L4. More or fewer local computing systems may be included in a region. Regions may be defined based on security boundaries, geographic location, logical proximity, or otherwise. In addition, threat intelligence system 140 may include a user interface to set or adjust regions based on changing topography of network 104.

Flow proceeds to operation 304, where third local traffic information is received from the third local computing system. In examples, the threat intelligence system 140 receives third local traffic information from local computing system L3.

Flow proceeds to operation 306, where fourth local traffic information from the fourth local computing system is received. In examples, the threat intelligence system 140 receives fourth local traffic information from local computing system L4.

Flow proceeds to operation 308, where a third threat measure of the malicious traffic in the third local computing system is caused to be amplified. As discussed, different schemas for instituting amplification are possible, in one example, operation 308 may be triggered when at least one of the following is true: (a) the fourth measure for local computing system L4 exceeds the local threshold; or (b) a first regional measure of the malicious traffic in a first region (R1) exceeds a second regional threshold. In examples, amplifying the third threat measure may comprise applying an amplification factor to the third threat measure. The amplification factor may be determined as described above.

Flow proceeds to operation 310, where threat mitigation at the third local computing system is implemented. As discussed, different schemas for instituting mitigation are possible. In one example, operation 310 may be triggered when at least one of the following is true: (a) the amplified third measure for local computing system L3 exceeds the local threshold; (b) a first regional measure of the malicious traffic in the second region (R2) exceeds a second regional threshold; or (c) a global regional measure of the malicious traffic in the network 104 exceeds a global threshold. In examples where threat mitigation for the third local computing system is implemented, mitigation actions are caused to be taken at the third local computing system. For example, this may comprise threat intelligence system 140 instructing a threat mitigation system 136 on local computing system L3 to perform one or more mitigation actions.

Flow proceeds to operation 312, where it is determined whether to cease amplification and/or mitigation. As discussed, the determination at operation 312 whether to cease some or all amplification or mitigation actions can be based on multiple factors discussed in relation to operation 218 above.

If it is determined at operation 312 that some portion of amplification and/or mitigation should be ceased, then flow proceeds to operation 314, where that portion of the amplification/mitigation currently being applied is ceased. For example, threat intelligence system 140 may stop amplifying threat measures received from, or derived for, local computing systems L1-L4, as needed. Further, threat intelligence system may provide instructions to threat mitigation system(s) 132, 134, 136, 138 to stop applying previously required mitigation actions (e.g., on-demand scrubbers may be de-allocated, filters that were being applied may be removed, etc.).

If it is determined at operation 312 that at least some portion of amplification and/or mitigation is not to be ceased, then the method 300 loops back periodically (or upon detection of an event/change affecting termination of amplification/mitigation) to again determine at operation 312 whether to cease the remaining amplification or mitigation until all amplification/mitigation for that threat has been ceased at operation 314.

Figure 4:
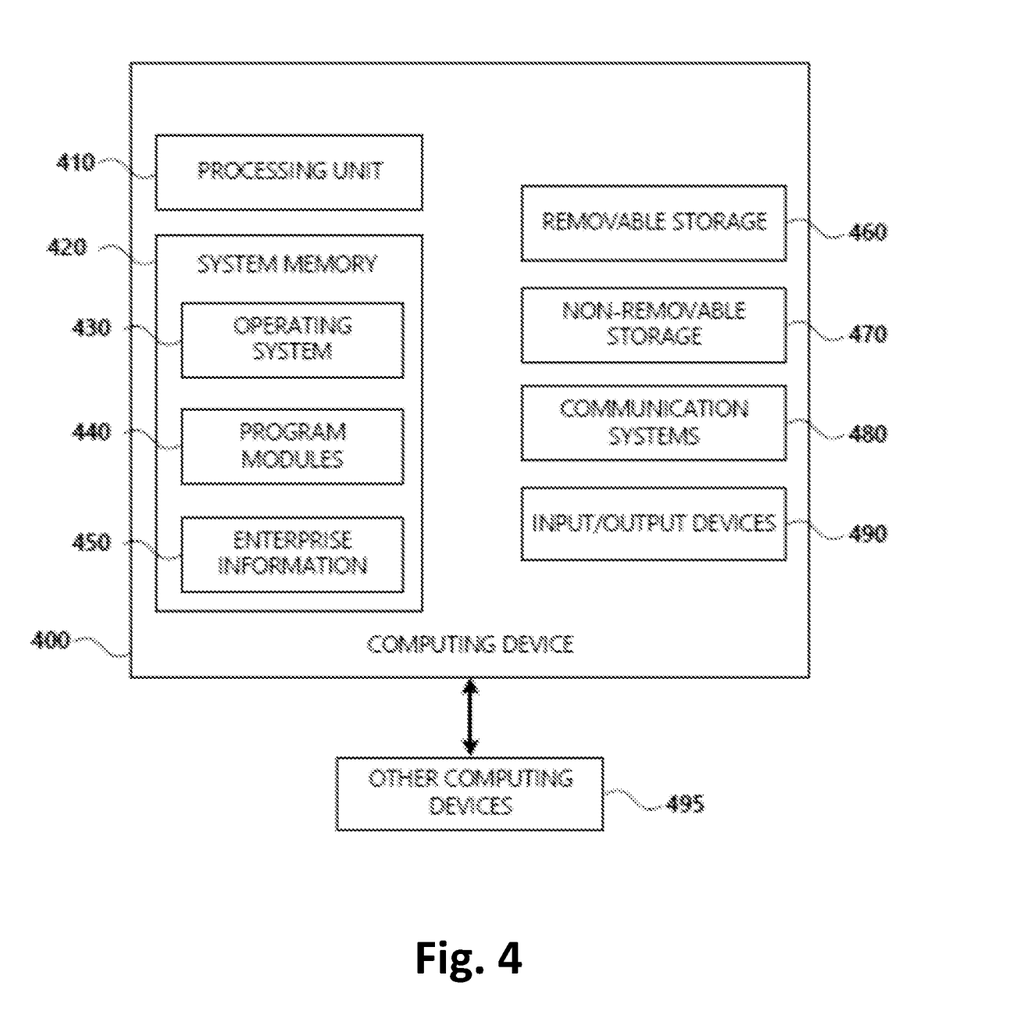
FIG. 4 depicts an example computing environment in which one or more of the present systems and methods may be practiced.

FIG. 4 is a system diagram of a computing device 400 according to an example. The computing device 400, or various components and systems of the computing device 400, may be integrated or associated with nodes 104, 106, 108, 110, 114 and client computing devices 102. As shown in FIG. 4, the physical components (e.g., hardware) of the computing device 400 are illustrated and these physical components may be used to practice the various aspects of the present disclosure.

The computing device 400 may include at least one processing unit 410 and a system memory 420. The system memory 420 may include, but is not limited to, volatile storage (e.g., random access memory), non-volatile storage (e.g., read-only memory), flash memory, or any combination of such memories. The system memory 420 may also include an operating system 430 that controls the operation of the computing device 400 and one or more program modules 440. The program modules 440 may be responsible for gathering or determining enterprise information 450 such as domain information, telephone numbers, attestation level requests and so on. A number of different program modules and data files may be stored in the system memory 420. While executing on the processing unit 410, the program modules 440 may perform the various processes described above.

The computing device 400 may also have additional features or functionality. For example, the computing device 400 may include additional data storage devices (e.g., removable and/or non-removable storage devices) such as, for example, magnetic disks, optical disks, or tape. These additional storage devices are labeled as a removable storage 460 and a non-removable storage 470.

Examples of the disclosure may also be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 4 may be integrated onto a single integrated circuit. Such a SOC device may include one or more processing units, graphics units, communications units, system virtualization units and various application functionality all of which are integrated (or "burned") onto the chip substrate as a single integrated circuit.

When operating via a SOC, the functionality, described herein, may be operated via application-specific logic integrated with other components of the computing device 400 on the single integrated circuit (chip). The disclosure may also be practiced using other technologies capable of performing logical operations such as, for example, AND, OR, and NOT, including but not limited to mechanical, optical, fluidic, and quantum technologies.

The computing device 400 may include one or more communication systems 480 that enable the computing device 400 to communicate with other computing devices 495 such as, for example, routing engines, gateways, signings systems and the like. Examples of communication systems 480 include, but are not limited to, wireless communications, wired communications, cellular communications, radio frequency (RF) transmitter, receiver, and/or transceiver circuitry, a Controller Area Network (CAN) bus, a universal serial bus (USB), parallel, serial ports, etc.

The computing device 400 may also have one or more input devices and/or one or more output devices shown as input/output devices 490. These input/output devices 490 may include a keyboard, a sound or voice input device, haptic devices, a touch, force and/or swipe input device, a display, speakers, etc. The aforementioned devices are examples and others may be used.

The term computer-readable media as used herein may include computer storage media. Computer storage media may include volatile and nonvolatile, removable and non-removable media implemented in any method or technology for storage of information, such as computer readable instructions, data structures, or program modules.

The system memory 420, the removable storage 460, and the non-removable storage 470 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. Any such computer storage media may be part of the computing device 400. Computer storage media is non-transitory and does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Aspects of the present invention, for example, are described above with reference to block diagrams and/or operational illustrations of methods, systems, and computer program products according to aspects of the invention. Systems depicted as blocks may be communicatively connected to one or more other systems described, whether or not such connection(s) is/are drawn as such. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved. Further, as used herein and in the claims, the phrase "at least one of element A, element B, or element C" is intended to convey any of: element A, element B, element C, elements A and B, elements A and C, elements B and C, and elements A, B, and C.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method of mitigating threats in a network, comprising:
defining a first region to include a first local computing system of the network and a second local computing system of the network;
receiving first local traffic information from the first local computing system;
receiving second local traffic information from the second local computing system;
determining, based on the first local traffic information, that a first measure of malicious traffic received in the first local computing system exceeds a local threshold;
determining, based on the second local traffic information, that a second measure of the malicious traffic received in the second local computing system does not exceed the local threshold;
causing a first mitigation action to be performed for the first local computing system; and
causing, in response to determining that the first measure of malicious traffic received in the first local computing system exceeds the local threshold, the second measure of the malicious traffic in the second local computing system to be amplified by causing a threat count of the malicious traffic in the second local computing system to be multiplied by an amplification factor.

2. The method of claim 1, further comprising:
causing a second mitigation action to be performed for the second local computing system upon detection of any of the following events:
the amplified second measure exceeds the local threshold;
a first regional measure of the malicious traffic in the first region exceeds a first regional threshold; or
a global regional measure of the malicious traffic in the network exceeds a global threshold.

3. The method of claim 1, wherein the first mitigation action comprises instantiating an on-demand scrubber at the first local computing system.

4. The method of claim 1, further comprising:
receiving third local traffic information from a third local computing system of the network;
determining a third measure of the malicious traffic in the third local computing system; and
causing the third measure of the malicious traffic in the third local computing system to be amplified.

5. The method of claim 4, wherein the third measure of the malicious traffic in the third local computing system is caused to be amplified only when the third measure is determined to be above zero.

6. The method of claim 4, further comprising:
defining a second region comprising the third local computing system;
wherein causing the third measure of the malicious traffic in the third local computing system to be amplified comprises amplifying the third measure upon detection of any one of the following events:
determining that a fourth local computing system in the second region has a fourth measure of the malicious traffic in the fourth local computing system that exceeds the local threshold; or
determining that the first regional measure of the malicious traffic in the first region exceeds the first regional threshold.

7. The method of claim 6, further comprising:
applying a third mitigation action to the third local computing system upon detection of any of the following events:
determining that the third measure exceeds the local threshold;
determining that a second regional measure of the malicious traffic in the second region exceeds a second regional threshold; or
determining that the global regional measure of the malicious traffic in the network exceeds the global threshold.

8. The method of claim 1, wherein the first mitigation action comprises instantiating an on-demand scrubber at the first local computing system.

9. The method of claim 1, further comprising:
determining a threat type for the malicious traffic;
wherein the amplification factor is determined based on the threat type.

10. A system of mitigating threats in a network, comprising:
at least one processor; and
non-transitory memory, operatively connected to the at least one processor and storing instructions that, when executed by the at least one processor, cause the system to perform a method, the method comprising:
defining a first region to include a first local computing system of the network and a second local computing system of the network;
receiving first local traffic information from the first local computing system;
receiving second local traffic information from the second local computing system;
determining, based on the first local traffic information, that a first measure of malicious traffic received in the first local computing system exceeds a local threshold;
determining, based on the second local traffic information, that a second measure of the malicious traffic received in the second local computing system does not exceed the local threshold;
causing a first mitigation action to be performed for the first local computing system; and
causing, in response to determining that the first measure of malicious traffic received in the first local computing system exceeds the local threshold, the second measure of the malicious traffic in the second local computing system to be amplified by causing a threat count of the malicious traffic in the second local computing system to be multiplied by an amplification factor.

11. The system of claim 10, wherein the method further comprises:
causing a second mitigation action to be performed for the second local computing system upon detection of any of the following events:
the amplified second measure exceeds the local threshold;
a first regional measure of the malicious traffic in the first region exceeds a first regional threshold; or
a global regional measure of the malicious traffic in the network exceeds a global threshold.

12. The system of claim 11, wherein the first regional measure of the malicious traffic in the first region comprises the first measure and the amplified second measure.

13. The system of claim 10, wherein the method further comprises:
receiving third local traffic information from a third local computing system of the network;
determining a third measure of the malicious traffic in the third local computing system; and
causing the third measure of the malicious traffic in the third local computing system to be amplified.

14. The system of claim 13, wherein the third measure of the malicious traffic in the third local computing system is caused to be amplified only when the third measure is determined to be above zero.

15. The system of claim 13, wherein the method further comprises:
defining a second region comprising the third local computing system;
wherein causing the third measure of the malicious traffic in the third local computing system to be amplified comprises amplifying the third measure upon detection of any one of the following events:
determining that a fourth local computing system in the second region has a fourth measure of the malicious traffic in the fourth local computing system that exceeds the local threshold; or
determining that the first regional measure of the malicious traffic in the first region exceeds the first regional threshold.

16. The system of claim 15, wherein the method further comprises:
applying a third mitigation action to the third local computing system upon detection of any of the following events:
determining that the third measure exceeds the local threshold;
determining that a second regional measure of the malicious traffic in the second region exceeds a second regional threshold; or
determining that the global regional measure of the malicious traffic in the network exceeds the global threshold.

17. The system of claim 10, wherein the method further comprises:
determining a threat type for the malicious traffic;
wherein the amplification factor is determined based on the threat type.

18. A method of mitigating threats in a network, comprising:
defining a first region to include a first local computing system of the network and a second local computing system of the network;
receiving first local traffic information from the first local computing system;
receiving second local traffic information from the second local computing system;
determining, based on the first local traffic information, that a first measure of malicious traffic received in the first local computing system exceeds a local threshold;
determining, based on the second local traffic information, that a second measure of the malicious traffic received in the second local computing system does not exceed the local threshold;
causing a first mitigation action to be performed for the first local computing system;
determining a threat type for the malicious traffic;
causing the second measure of the malicious traffic in the second local computing system to be amplified by an amplification factor, wherein the amplification factor is determined based on the threat type; and
causing a second mitigation action to be performed for the second local computing system upon detection of any of the following events:
the amplified second measure exceeds the local threshold;
a first regional measure of the malicious traffic in the first region exceeds a first regional threshold; or
a global regional measure of the malicious traffic in the network exceeds a global threshold.

* * * * *